US008326056B2

(12) United States Patent
Schechter

(10) Patent No.: US 8,326,056 B2
(45) Date of Patent: Dec. 4, 2012

(54) CROSS-DOMAIN BROWSER PRE-FETCHING THROUGH DATA TRANSCODING

(75) Inventor: Greg D. Schechter, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 373 days.

(21) Appl. No.: 12/816,497

(22) Filed: Jun. 16, 2010

(65) Prior Publication Data

US 2011/0311136 A1    Dec. 22, 2011

(51) Int. Cl.
*G06K 9/36* (2006.01)
(52) U.S. Cl. ........................................................ 382/232
(58) Field of Classification Search .................. 382/232, 382/233; 709/200, 217, 219, 223; 707/E17.116
See application file for complete search history.

(56) References Cited

U.S. PATENT DOCUMENTS

| 7,359,395 B2 * | 4/2008 | Toporek et al. ............... 370/401 |
| 2008/0021740 A1 | 1/2008 | Beane et al. |
| 2009/0138937 A1 | 5/2009 | Erlingsson et al. |
| 2010/0002943 A1 | 1/2010 | Moon et al. |

OTHER PUBLICATIONS

"Digital Image File Types Expalined", Retrieved at << http://www.wfu.edu/~matthews/misc/graphics/formats/formats.html >>, Retrieved Date: Apr. 12, 2010, p. 5.
"MrSID Technology Primer", Retrieved at << http://www.lizardtech.com/files/geo/techinfo/MrSID_Tech_Primer.pdf >>, Nov. 2004, pp. 1-6.
Wiggins, et al., "Image File Formats: Past, Present, and Future", Retrieved at << http://radiographics.rsna.org/content/21/3/789.full >>, May 2001, pp. 12.
"What's New in Leadtools v16.5?", Retrieved at << http://www.dscallards.com/lead_v16.5.html >>, Retrieved Date: Apr. 12, 2010, p. 3.

* cited by examiner

Primary Examiner — Jose Couso

(57) ABSTRACT

Browser application programs may be prevented from performing cross-domain retrieval of anything other than image files. To enable browsers to pre-fetch resources utilizable by code executing in a browser-based programmatic environment, without having to wait for the environment, and the code, to be instantiated and make the cross-domain request themselves, the cross-domain resources can be transcoded into image files. Once retrieved, these "image" files can be retained locally in a browser cache and provided to the code executing in the browser-based programmatic environment from there much more quickly. Then the code can decode the "image" and extract the original resource file, which the code can then utilize. The transcoding of resources into image files can be performed by first determining the height and width of an image file that will result in the least amount of wasted space when the resource is transcoded into it.

20 Claims, 5 Drawing Sheets

CROSS-DOMAIN BROWSER PRE-FETCHING THROUGH DATA TRANSCODING

BACKGROUND

To facilitate interoperability between computing devices, and different sets of computer-executable instructions executing on computing devices, standards are typically established that define certain parameters, such as formatting parameters or operational parameters. By conforming to such defined parameters, multiple independent actors, such as independent computing devices, or independent sets of computer-executable instructions executing on one or more computing devices, can more easily exchange data, establish communicational connections, and otherwise interoperate.

In some cases, rather than an explicit standard, independent sets of computer executable-instructions that are each directed to the same task can share operational traits that are merely the result of established operational expectations. For example, although no explicit standard calls for it, content creation application programs often present various tools and other information through a toolbar, or other area, that is positioned at the top of the window or other graphical interface through which such a content creation application program interacts with users.

Within the context of the ubiquitous Internet, and equally ubiquitous World Wide Web (WWW), there exist both a myriad of explicit standards and established operational expectations. One such established operational expectation, that can perhaps be considered a de facto standard, is the limitation of web browser application programs to retrieve data from a different domain than the domain of the web page they are currently parsing and displaying. Traditionally known as the "same origin policy", the policy prevents web browser application programs from accessing resources hosted from a different domain than that with which they are currently communicating. One notable exception to the same origin policy is that web browser application programs are typically allowed to retrieve and display images in respective of the domain that is hosting the image data. Another notable exception is that computer-executable instructions executing through programmatic environments that can be hosted within a web browser application can perform cross domain resource retrieval once such computer executable-instructions have been loaded and instantiated, and provided other relevant conditions are met.

SUMMARY

In one embodiment, resources can be transcoded as images and can be pre-fetched by a browser application program before computer-executable instructions that can utilize such resources are instantiated within a browser-based programmatic environment. When such computer-executable instructions are instantiated within the browser-based programmatic environment, they do not need to obtain the resources through network communications, but can instead be provided the resources from the browser's local cache, resulting in potentially substantially faster access.

In another embodiment, computer-executable instructions executing within a browser-based programmatic environment can request resources as images, can be provided those images, such as from the browser's own local cache, and can then decode those images into the original resources, and then utilize those resources in a traditional manner.

In a further embodiment, resources that are to be provided to computer executable instructions executing within a browser-based programmatic environment can be transcoded into images such that they may be pre-fetched across different domains prior to the instantiation of those computer executable instructions within that browser based programmatic environment.

In a still further embodiment, the transcoding of resources into images can be performed by selecting an image size appropriate for the size of the resource to be transcoded, and which minimizes the amount of wasted space within the image into which the resource was transcoded.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which

DETAILED DESCRIPTION

Figure 1:
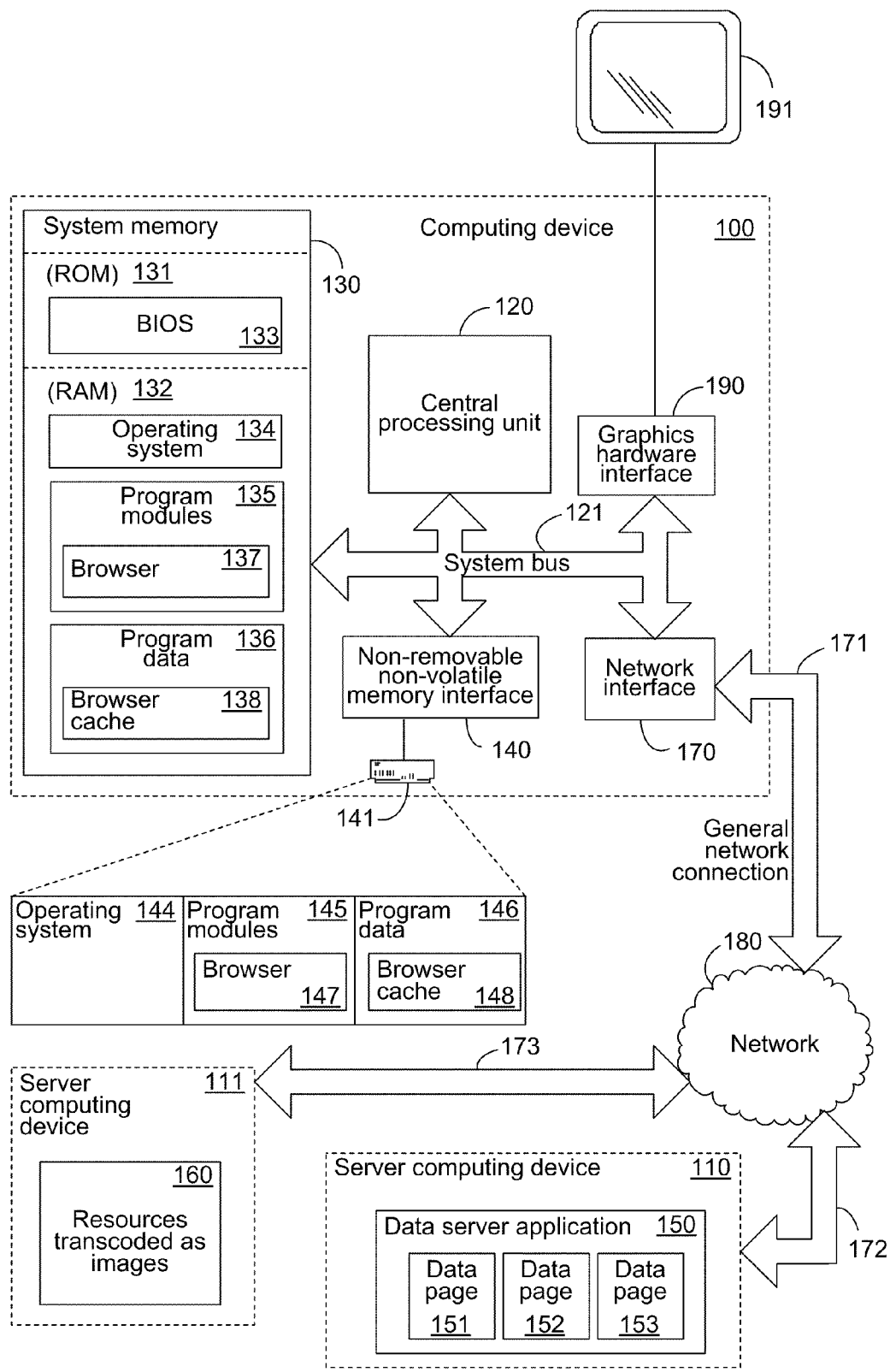
FIG. 1 is a block diagram of an exemplary computing device.

The following description relates to the transcoding of resources into images so that they may be pre-fetched by a browser application program, even across multiple domains, prior to being needed by computer-executable instructions executing within a browser-based programmatic environment. By pre-fetching the resources, the computer executable-instructions executing within the browser-based programmatic environment can provide more immediate feedback to a user, thereby improving the user's experience. The transcoded resources can be decoded back into their original form, and then utilized, by the computer-executable instructions executing within the browser-based programmatic environment. When being transcoded into an image, the size of the resource can be taken into account to transcode the resource into an image whose resolution minimizes the amount of wasted space within the image file.

While the below descriptions are provided within the context of, and the limitations inherent in, web browsers utilized to browse the World Wide Web (WWW), they are not so limited. In particular, the mechanisms described are equally applicable to any environment where an application program is limited in what types of resources it can obtain. As such, references to limitations of web browsers, and otherwise to the specific behavior of web browsers, are meant to be exemplary only and do not indicate any specific limitation of the mechanisms described.

Although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures, where data is maintained, are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

Turning to FIG. 1, an exemplary computing device 100 is shown. The exemplary computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. The exemplary computing device 100 can optionally include graphics hardware, including, but not limited to, a graphics hardware interface 190 and a display device 191. Such graphics hardware, including the graphics hardware interface 190 and a display device 191, can be utilized to, not only display the below-described user interface, but also, in some embodiments, to perform some or all of the relevant computation and processing described below.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, other program modules 135, and program data 136.

A browser application program 137, whose operation will be described in detail below, can be a component of the operating system 134 or, alternatively, it can be a separate collection of computer-executable instructions that can be considered as part of the program modules 135. As yet another alternative, components of the operating system 134 and the program modules 135 can operate in concert to perform the functionality attributed below to the browser 137. For ease of reference, it is shown in FIG. 1 as being part of the program modules 135. In addition, the program data 136 can comprise a cache of information that can be maintained by, or on behalf of, the browser 137. Such a browser cache 138 is shown in FIG. 1 and typically contains data obtained by the browser 137, such as from other computing devices communicationally coupled to the computing device 100 via the network 180.

The computing device 100 may also include other removable/non-removable, volatile/nonvolatile computer storage media. By way of example only, FIG. 1 illustrates a hard disk drive 141 that reads from or writes to non-removable, non-volatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies. As such, the browser 147 of the program modules 145 and the browser cache 148 of the program data 146, are likewise given different numbers to illustrate that, at a minimum, they are different copies of the browser 137 and browser cache 138, respectively.

Additionally, the computing device 100 can operate in a networked environment using logical connections to one or more remote computers. For simplicity of illustration, the computing device 100 is shown in FIG. 1 to be connected to a network 180 that is not limited to any particular network or networking protocols. The logical connection depicted in FIG. 1 is a general network connection 171 that can be a local area network (LAN), a wide area network (WAN) or other network. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

The network 180 can have communicationally coupled to it other computing devices, such as the server computing devices 110 and 111 that, although not specifically shown in FIG. 1, can comprise equivalent hardware as that described above with reference to the exemplary computing device 100, including, for example, a central processing unit, a system bus, system memory, non-volatile storage, and a network interface that can be equivalent to, respectively, the central processing unit 120, the system bus 121, the system memory 130, the hard disk drive 141, and the network interface 170 that were described in detail above. The network interface of the server computing device 110 can maintain a communicational connection 172 to the network 180 that can be analogous to the general network connection 171, maintained by the computing device 100, while, analogously, the network interface of the server computing device 111 can maintain the communicational connection 173 to network 180 that can also be analogous to the general network connection 171, maintained by the computing device 100, and described above.

In addition, unlike the exemplary computing device 100, the server computing device 111 can comprise resources transcoded as images 160. The resources that can be transcoded as images, and can comprise the resources transcoded as images 160, can comprise text, photographs, audio recordings, video content, downloadable computer-executable instructions, downloadable computer readable-data, locally-executable computer-executable instructions and other like content.

Similarly, the server computing device 110 can comprise a data server application 150 whose computer-executable instructions can be stored on a non-volatile storage of the server computing device and can be executed, in the system memory of the server computing device, by its central processing unit, in the same manner as the computer-executable instructions stored on the hard disk drive 141, and executed in the system memory 130, of the exemplary computing device 100, described in detail above. The data server application 150 can comprise one or more formatted pages of data, such as the data pages 151, 152 and 153 that can present data to an appropriate network browser application program, such as the browser application program 137 executing on the exemplary computing device 100, which can be communicationally coupled to the data server application 150, and can retrieve any one of the data pages 151, 152 and 153, via the network connections 171 and 172 that the exemplary computing device 100, and the server computing device 110, respectively, maintain to the network 180.

In one embodiment, the data pages 151, 152 and 153 can be web pages such as those of the World Wide Web (WWW). In such an embodiment, the data pages 151, 152 and 153 can present data utilizing the structured data presentation techniques of the well-known HyperText Markup Language (HTML). Similarly, the network 180, in such an embodiment, can be the well known Internet, while the browser application 137 can be a web browser application program, and the data server application 150 can be a web server application program. In such an embodiment, the HTML coding employed to define the data pages 151, 152 and 153 can reference, through links, the resources transcoded as images 160. As will be known by those skilled in the art, if the server computing device 111 belonged to a different domain than the server computing device 110, then the web browser application 137 would, typically, not be able to retrieve resources from the server computing device 111 if such resources were referenced by a web page, such as the web pages 151, 152 and 153, that were being hosted by the server computing device 110. Technically, however, as will also be known by those skilled in the art, an exception to such a cross-domain policy is made for images. Thus, if the web browser 137 were to recognize the resources transcoded as images 160 as image files, which, in fact, they would be, then the web browser 137 could retrieve such images from the server computing device 111 as part of the parsing and displaying of any one or more of the web pages 151, 152, 153 posted by the server computing device 110, even if the server computing device 110 were associated with a different domain than the server computing device 111.

Figure 2:
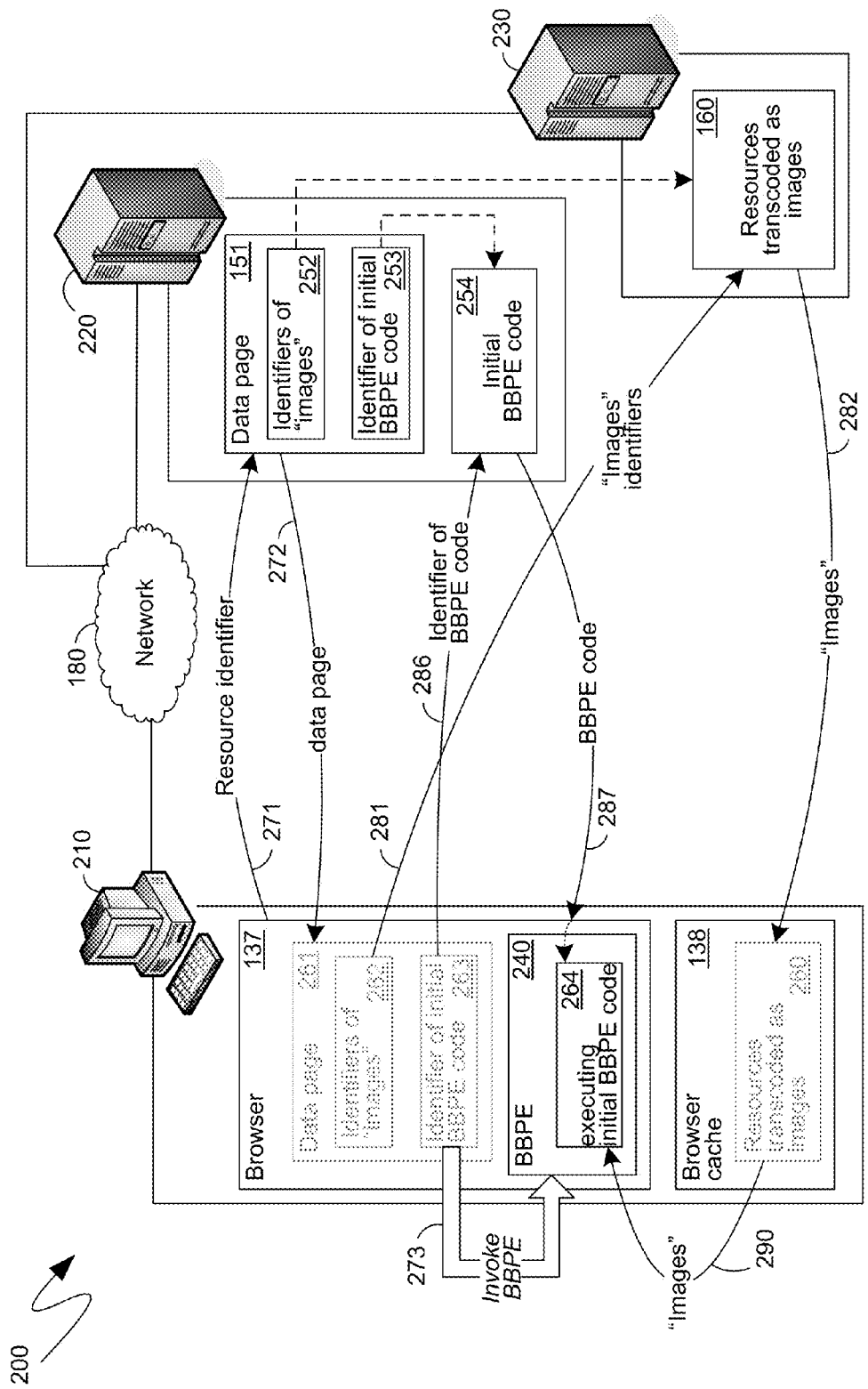
FIG. 2 is a block diagram of an exemplary operation of pre-fetching resources transcoded as images.

Turning to FIG. 2, the system 200 shown therein illustrates exemplary mechanisms by which the resources transcoded as images 160 can enable a browser, such as the browser 137, to pre-fetch resources from a different domain than that hosting the data page, such as the data page 151, that the browser is currently parsing, and have such resources already available locally on a computing device, such as the computing device 210, on which the browser 137 is executing when such resources may be requested, such as by computer-executable instructions that can execute within a browser-based programmatic environment. As utilized herein, the term "browser-based programmatic environment", or "BBPE" means any programmatic environment hosted by a browser application, such as the browser application 137, that can provide for the execution of computer-executable instructions specifically directed to, and within the confines of, that programmatic environment. Current examples of such browser-based programmatic environments include Sliverlight® from Microsoft Corporation, Flash® from Adobe Systems, Incorporated and JavaFX™ from Oracle Corporation.

In the system 200 of FIG. 2, the computing device 210 can be in the form of the exemplary computing device 100 shown in FIG. 1 and described in detail above. Likewise, the server computing devices 220 and 230 can be in the form of the server computing devices 110 and 111 shown in FIG. 1 and also described in detail above. Each of the computing devices 210, 220 and 230 can maintain a communicational connection to the network 180, thereby enabling the computing devices 210, 220 and 230, and computer-executable instructions executing thereon, to communicate with one another. Additionally, for purposes of the below descriptions, the server computing device 230 can be considered to be part of the different domain than the server computing device 220. As such, again for purposes of the below descriptions, the browser application 137, executing on the computing device 210, can be considered to be prevented from obtaining resources, other than image files, from the server computing device 230 as part of the parsing of a data page, such as the data page 151, being hosted by the server computing device 220. Although the present example focuses on browser applications that are prevented from obtaining any resource, other than images, from a cross-domain server, the descriptions provided herein are equally applicable to any such browser limitations. For example, if the browser application 137 were prevented from obtaining resources other than plain text files from a cross-domain server, such as the server computing device 230, then the present descriptions would be equally applicable, except that the resources transcoded as images 160 would be resources transcoded as plain text files. As indicated previously, the mechanisms described herein can be utilized to circumvent any limitation in an application, such as the browser application 137, directed to which types of files such an application may, or may not, obtain from specific sources, such as cross-domain sources.

Turning back to the system 200 of FIG. 2, as also indicated previously, a browser-based programmatic environment, such as the BBPE 240, can have computer-executable instructions executing within it that can be allowed to obtain resources from the server computing device 230 even if such computer executable instructions were originally downloaded from the server computing device 220. However, as also indicated previously, such an ability can require that the computer-executable instructions that are to execute within the BBPE 240 are to be downloaded from the server computing device 220, and then instantiated within the BBPE 240 on the computing device 210, prior to being able to obtain resources from the server computing device 230.

The transcoding of resources as images, however, can enable the browser application 137, itself, to obtain the resources trans-coded as images 160 from the server computing device 230 as part of the parsing of the data page 151 from the server computing device 220 prior to the instantiation of computer-executable instructions that can execute within the BBPE 240. More specifically, as shown in the system 200 of FIG. 2, the browser application 137 can initially request the data page 151 from the server computing device 220 via the provision of a resource identifier, such as that shown by the communication 271. As will be recognized by those skilled in the art, the communication 271 is a simplification of the actual steps by which a browser, such as the browser 137, can utilize the resource identifier to identify, locate, and request a data page, such as the data page 151, on a computing device, such as the server computing device 220, as communicationally coupled to the network 180. However, for purposes of the mechanisms being described, the exact manner in which the browser 137 obtains the information from the data page 151, is irrelevant, as the described mechanisms are agnostic to such details.

In response to the communication 271, from the browser 137, executing on the computing device 210, the server computing device 220 can return the information contained in the data page 151 that was requested by the communication 271. Thus, as represented by the communication 272 shown in the system 200 of FIG. 2, the information of the data page 151 can be provided to the browser 137, resulting in a copy, within the execution environment of the browser 137, of that same information. The ghosted data page 261 shown in the system 200 of FIG. 2 is meant to graphically represent the copy of the information of the data page 151 within the execution environment of the browser 137 on the computing device 210, that was provided via the communication 272. Among the information of the data page 151 can be one or more identifiers of "images" 252 that can reference the resources transcoded as images 160 on the server computing device 230. As will be known by those skilled in the art, the identifiers of "images" 252 can be in a similar form to the resource identifier, originally utilized in the communication 271, and can enable the browser 137, through similar mechanisms, to identify, locate, and obtain the resources transcoded as images 160 from the server computing device 230. Additionally, the information of the data page 151 can also comprise one or more identifiers of initial BBPE code 253 that, like the identifiers of "images" 252, can enable the browser 137 to identify, locate, and obtain the initial BBPE code 254, which, in the present example, can be on the same server computing device 220 as the data page 151. The dashed arrows from the identifiers of "images" 252 to the resources transcoded as images 160, and from the identifier of initial BBPE code 253 to the initial BBPE code 254, are meant to represent this identification.

As shown in the system 200 of FIG. 2, the copy of the data page 261 that can have been provided to the browser 137, on the computing device 210, via the communication 272 from the server computing device 220, can likewise comprise identifiers of "images" 262 and an identifier of the initial BBPE code 263. Thus, when parsing the information of data page 261 to display the data page, such as on the display device 191 shown in FIG. 1, the browser 137 can, upon encountering these identifiers, proceed to attempt to retrieve and handle the information identified by these identifiers. For example, the identifier of the initial BBPE code 263 can cause the browser 137 to invoke a browser-based programmatic environment 240, as illustrated by the action 273. Additionally, as illustrated by the action 286, the browser 137 can request the initial BBPE code 254, identified by the identifier of initial BBPE code 263, from the server computing device 220. When that initial BBPE code 254 is returned, by the server computing device 220, as illustrated by the communication 287, the browser 137 can provide it to the BBPE 240 and, within the BBPE 240, the initial BBPE code 254 can be instantiated and executed as the executing initial BBPE code 264, as shown in the system 200 of FIG. 2.

In one embodiment, the executing initial BBPE code 264 can look to execute other, more substantial, BBPE code. Traditionally, the executing initial BBPE code 264 would, after being instantiated within the BBPE 240, make a cross-domain request to the server computing device 230 from which it could receive that subsequent BBPE code. However, because that subsequent BBPE code, as well as other resources, can have been transcoded as images, the browser 137 can have already obtained the resources transcoded as images 160, from the server computing device 230, and can have them already present on computing device 210, specifically as the copy of the resources transcoded as images 260 stored in the browser cache 138.

As with the identifier of the initial BBPE code 263 that the browser 137 utilized, as part of the parsing of the data page 261, to obtain the initial BBPE code 254 from the server computing device 220, in the same manner the browser 137 can utilize the identifiers of "images" 262, that are also part of the data page 261, to identify, locate, and request the resources transcoded as images 160 from the server computing device 230, as indicated by the cross domain request 281. As will be recognized by those skilled in the art, the cross domain request 281 can be performed concurrently with the invocation 273 of the BBPE 240. Thus, while the BBPE 240 is being loaded by the browser 137, and the initial BBPE code 254 is being retrieved from the server computing device 220, and is being instantiated as the executing initial BBPE code 264, the browser 137 can be requesting, as indicated by the communication 281, and receiving, as indicated by the communication 282, at least some of the resources transcoded as images 160 from the server computing device 230. As with any other image file, the browser 137 can store the received resources transcoded as images 260 in the browser cache 138.

In one embodiment, once the initial BBPE code 254 has been instantiated as the executing initial BBPE code 264, in the BBPE 240, the executing initial BBPE code 264, rather than requesting subsequent BBPE code can, instead, request at least some of the resources transcoded as images 160. Since a copy 260 of the resources transcoded as images 160 exists in the browser cache 138, the browser 137 can satisfy such a request of the executing initial BBPE code 264, by providing it the resources transcoded as images 260 from the browser cache 138, as indicated by the communication 290 in the system 200 of FIG. 2. As should be recognized by those skilled in the art, the communication 290, being a communication local to the computing device 210, can be completed much more quickly, and more efficiently, than the network communication 282.

Upon receiving, as a result of the communication 290, the resources transcoded as images 260, from the browser cache 138, the executing initial BBPE code 264 can decode the resources transcoded as images 260 into the original format of those resources. In one embodiment, the original format of the resources requested can be that of the subsequent BBPE code that is to be instantiated, in the BBPE 240, by the executing initial BBPE code 264. Consequently, as can be seen, by transcoding such subsequent BBPE code into an image format, the browser 137 can pre-fetch such subsequent BBPE code, even cross-domain, and without restriction, while the BBPE 240 is being loaded, and while the initial BBPE code 254 is being instantiated as the executing initial BBPE code 264, and the user need not wait for those two events to occur before the executing initial BBPE code 264 can make a cross domain request for the subsequent BBPE code. Instead, the subsequent BBPE code can already be waiting, as one of the resources transcoded as images 260, locally on the computing device 210, in the browser cache 138.

In another embodiment, the executing initial BBPE code 264 can, rather than execute other BBPE code, instead look to process other data, such as hypermedia data, structured data, such as eXtensible Markup Language (XML) files, or the like. In such an embodiment, the resources transcoded as images 160 can be hypermedia files, XML files, or other data or executable files. As above, because the resources transcoded as images 160 are, in fact, perceived to be images, the browser 137 can have already obtained them from the server computing device 230, and can have them already present on computing device 210, as the copy of the resources transcoded as images 260 stored in the browser cache 138. The executing initial BBPE code 264 can then, as before request "images" that the browser 137 can satisfy from the resources transcoded as images 260 in the browser cache 138. The executing initial BBPE code 264 can decode the resources transcoded as images 260 into the original format of those resources, such as the hypermedia files, XML files, and the like.

Figure 3:
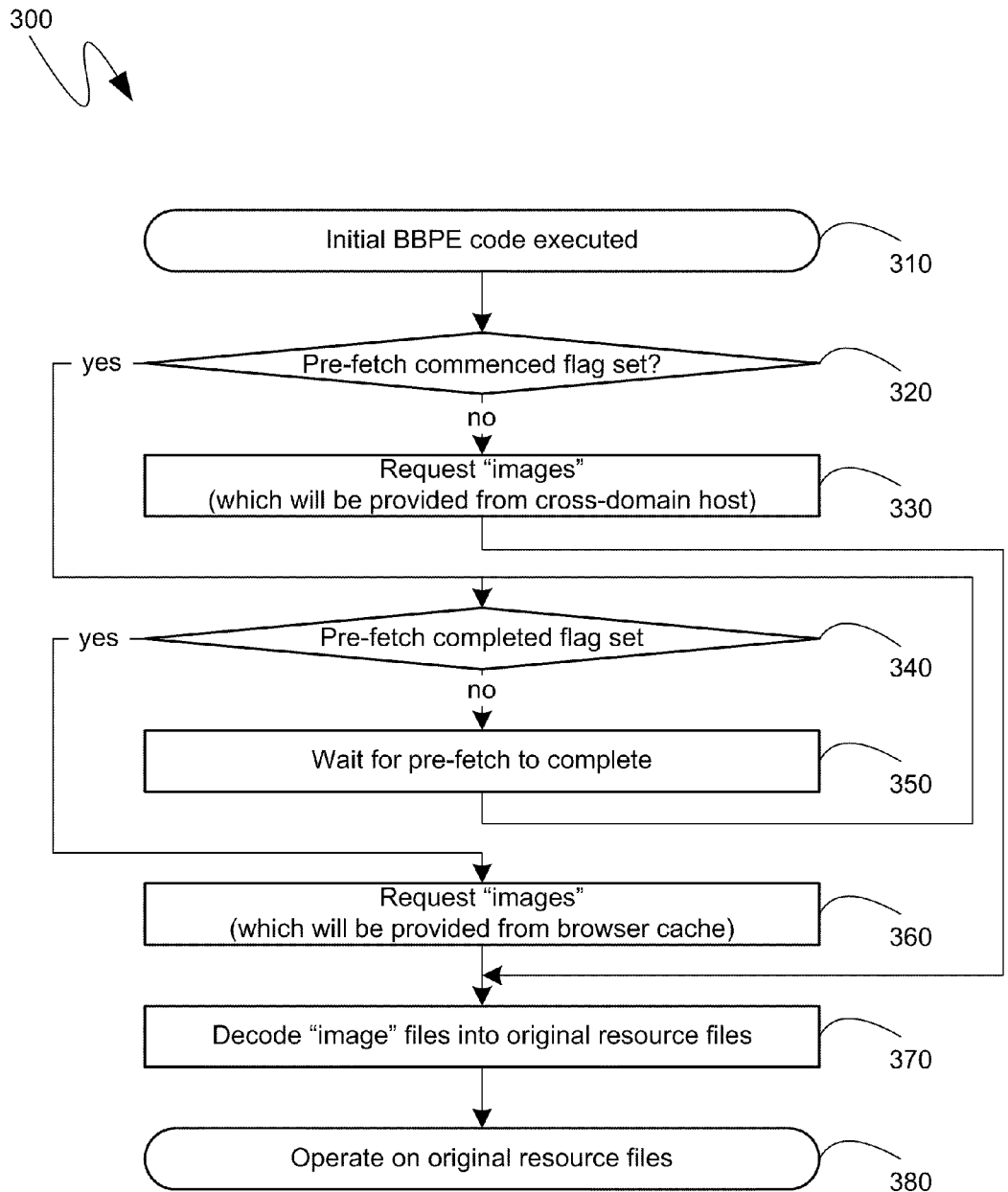
FIG. 3 is a flow diagram of an exemplary operation of pre-fetching resources transcoded as images.

Turning to FIG. 3, the flow diagram 300 shown therein illustrates an exemplary series of steps that can be performed by the initial BBPE code 254, shown in FIG. 2. Initially, as shown in the flow diagram 300 of FIG. 3, at step 310, the initial BBPE code can be executed, or otherwise instantiated, within the browser-based programming environment. Subsequently, at step 320, a check can be made as to whether a flag has been set that can indicate whether the browser has already commenced pre-fetching the resources transcoded as images. In one embodiment, such a flag can be set, such as by the browser 137, shown in FIGS. 1 and 2, to enable the initial BBPE code 254, again shown in FIG. 2, to determine whether to wait for the pre-fetch to complete or whether to just simply request the resources transcoded as images, thereby causing the browser 137 to reinitiate network communications with, for example, the server computing device 230 of FIG. 2. Thus, if such a pre-fetch commenced flag is not set, as determined at step 320, the initial BBPE code can proceed to request the relevant "images", which can be the resources transcoded as images, at step 330. As indicated by the flow diagram 300 of FIG. 3, the request, at step 330, can cause the browser to obtain the requested "images" anew from the cross-domain host.

Conversely, if, at step 320, it is determined that the pre-fetch commenced flag was set, then processing can proceed to step 340, at which point it can be determined whether the pre-fetch completed flag is set. In one embodiment, the browser 137, shown in FIGS. 1 and 2, can both set a flag to indicate that it has commenced pre-fetching the resources transcoded as images, and can set a different flag to indicate that it has completed pre-fetching those "images". If, at step 340, it is determined that the pre-fetch completed flag has not yet been set, then processing can proceed to wait for the pre-fetch to complete, at step 350, before looping again to check whether the pre-fetch completed flag has been set at step 340.

If, however, the pre-fetch completed flag has been set at step 340, the initial BBPE code can proceed to request the relevant "images", which can be the resources transcoded as images, at step 360. As indicated by the flow diagram 300 of FIG. 3, the request, at step 360, can cause the browser to obtain the requested "images" from its cache, which can be stored locally on the computing device on which the browser is executing. As will be recognized by those skilled in the art, the obtaining of the requested "images" at step 360 can occur substantially faster than the obtaining of the requested "images" at step 330.

Once the relevant "images", or, more accurately, resources transcoded as images, have been obtained, either in response to the request at step 330, or in response to the request at step 360, the initial BBPE code can decode those "image" files into their original form at step 370. In one embodiment, at least some of the resources transcoded as images can be decoded into original BBPE code files. In such an embodiment, at step 380, the initial BBPE code can instantiate, or otherwise commence execution, of those subsequent BBPE code files that were decoded at step 370. In an alternative embodiment, as described above, the resource files can comprise other types of files, such as hypermedia files, XML files, and the like. In such an alternative embodiment, the decoding of the "image" files at step 370 can yield those resources in their native file format. Subsequently, at step 380, operations can be performed on those resource files. For example, a hypermedia file can be displayed to the user, such as via the display device 191 shown in FIG. 1, and user interactivity with such hypermedia data can be enabled. Similarly, an XML file can be processed, at step 380, in a known manner. The relevant processing illustrated by the flow diagram 300 of FIG. 3 can end at step 380, since subsequent processing can proceed in a traditional manner, irrespective of whether the "image" files were able to be pre-fetched, utilizing the above described mechanisms, and, thereby, delivered to the initial BBPE code more efficiently, or whether they were obtained by the BBPE code from the cross-domain host, such as the server computing device 230 shown in FIG. 2, in the traditional, slower, manner.

While the above descriptions have described the decoding of the "image" files as being performed by some initial BBPE code executing within the BBPE, such decoding can equally be performed by the browser itself, or by the BBPE itself. For example, a browser can be modified that, when fetching a resource that has been transcoded as an image file, of the browser itself decodes the image file into the original resource and retains the original resource in the browser cache. In such an embodiment, BBPE code could simply request the original resource and have it provided to it, by the browser, from the browser's cache. As another alternative embodiment, the BBPE itself can perform the decoding such that, when BBPE code requests a resource, the BBPE requests a corresponding image file into which the requested resource has been transcoded, and then decodes the image file into the original resource prior to providing it to the BBPE.

Figure 4:
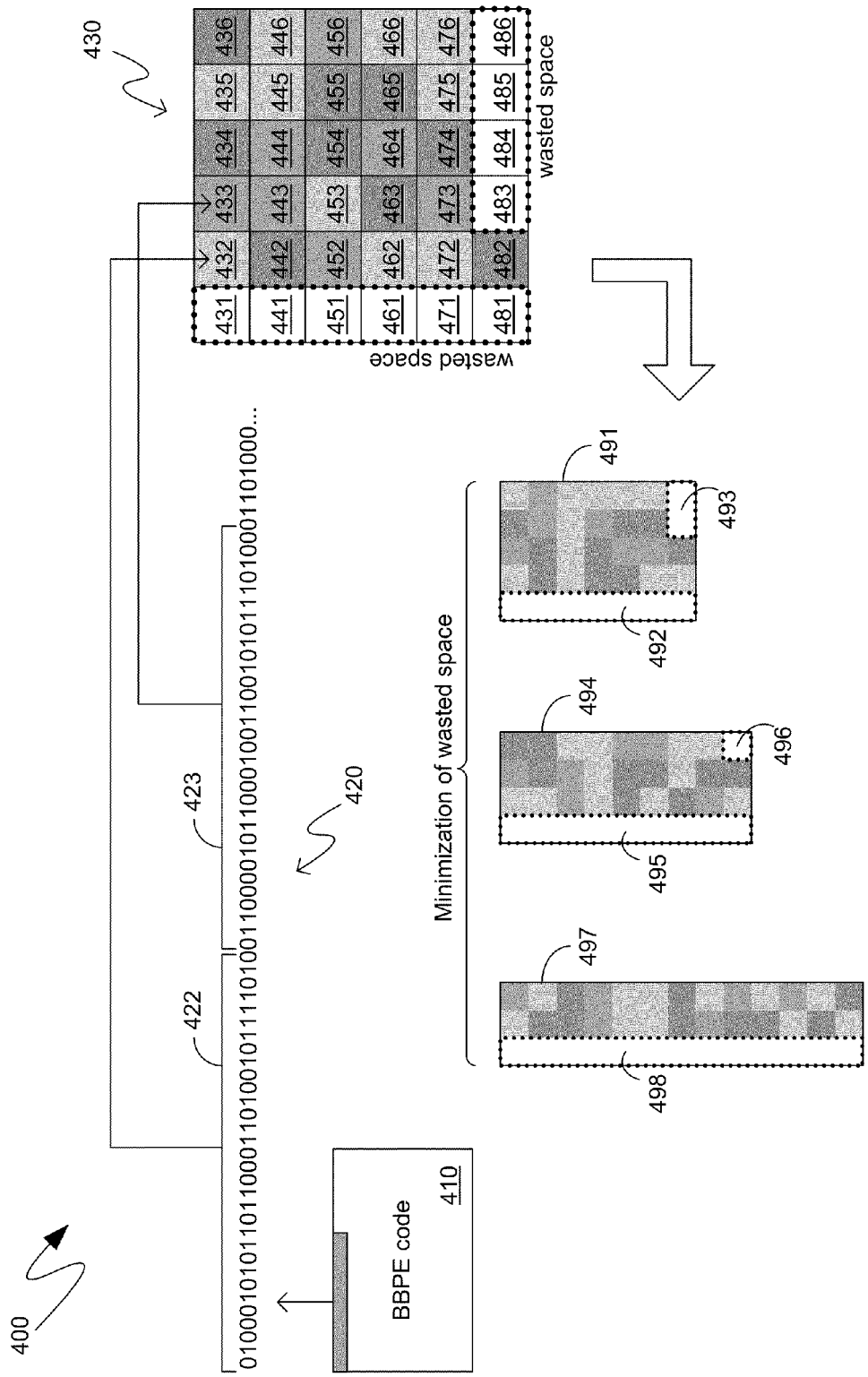
FIG. 4 is a block diagram of an exemplary transcoding of resources as images.

Turning to FIG. 4, system 400 shown therein illustrates one exemplary embodiment by which a resource can be transcoded as an image file. In the exemplary embodiment of the system 400, the resource that will be shown as being transcoded into an image file is the BBPE code 410, which can be the subsequent BBPE code, referenced above, whose execution can be initiated by the initial BBPE code 254, shown in FIG. 2. As will be recognized by those skilled in the art, the BBPE code 410 can, like all computer-storable resources, be expressed as a sequence of binary values 420. In one embodiment, specific collections of those binary values 420 can be utilized to define individual pixels in an image file 430. For example, many modern image files support the defining of a color of a specific pixel by utilizing 32 bits of information. Consequently, the binary values 420 can be partitioned into 32-bit segments, such as the 32-bit segment 422 and the 32-bit segment 423, and those segments can be utilized as the image definitional values of sequential pixels, such as the sequential pixels 432 and 433 of the image 430. For example, the 32-bit the segment 422 can define a specific 32-bit color to be applied to the pixel 432, while the subsequent 32-bit segment 423 can define another, specific 32-bit color to be applied to the pixel 433 that can be located adjacent to the pixel 432.

Because the sequence of binary values 420 was not intended to represent color choices, the specific color, for example, defined by any particular segment, such as the segments 422 and 423, may be completely random within the universe of potential color possibilities. For example, the binary values of the segment 422 can represent a randomly different color than the binary values of the segment 423. Consequently, the pixel 432 defined by the binary values of the segment 422 can be a randomly different color than the pixel 433 defined by the binary values of the segment 423. The differences in the shading of the pixels 432 and 433 are meant to visually illustrate such a random difference in color. The resulting image 430, therefore, can visually appear as nothing more than a mishmash of randomly colored pixels, as is intended to be represented by the different shading in the pixels 432-436, 442-446, 452-456, 462-466, 472-476 and 482-486 of the image 430.

However, because the image 430 is not, actually, an image designed for human viewing, compression algorithms or other image processing that is designed to retain an appearance—from a human perspective—while compressing the data of an image, should not be utilized. Such compression can include image formats that are known as "lossy" formats. In one embodiment, the image 430 can be in a lossless image format, since the exact binary values 420 can be necessary to be extracted back out of the pixels 432-436, 442-446, 452-456, 462-466, 472-476 and 482-486 in order to regenerate the resource file, such as the BBPE code 410.

In one embodiment, the pixels 432-436, 442-446, 452-456, 462-466, 472-476 and 482-486 of the image 430 can be structured and arranged in accordance with whatever image format the image 430 conforms to. For example, some image formats require header information at the beginning of each row of pixels. Such a header information can be determined in accordance with the image format and, as such, may not be able to represent any of the binary values 420 that are to be encoded into the image format. Thus, the spaces 431, 441, 451, 461, 471 and 481 are meant to illustrate that the information contained in, for example, the headers of each row, is, at least as far as the transcoding of the binary values 420 into an image format, wasted space. While the spaces 431, 441, 451, 461, 471 and 481 are shown at the beginning of a row, such spaces can equally represent the footer information, checksum information, or other like information that can be encoded in any position within the rows, or columns, of pixels of the image 430. Ultimately, as will be recognized by those skilled in the art, the exact amount of wasted space, as well as its location, can be format dependent. Thus, while the present descriptions focuses on image formats that comprise wasted space on a per-row basis, the mechanisms described herein are equally applicable to other image formats, including those whose format results in wasted space, not a per-row basis, but perhaps a per-column basis, or an aggregate pixel basis, or the like.

Additionally, an image, such as the image 430, can comprise pixels across the entire width of the image. As such, if no further binary values, from the binary values 420, remain, the rest of the pixels of the last row of an image can simply be encoded as all zeros, all ones, or another like encoding scheme to signify that the color values of those pixels do not represent a portion of the binary values 420 of the BBPE code 410. Thus, as shown in the system 400 of FIG. 4, for example, the pixel 482 can have a color associated with it that is defined by the last binary values of the binary values 420. Consequently, pixels 483-486 can, again, be wasted space, since they comprise binary data, but such binary data is not part of the binary values 420 and is, instead, merely "filler" binary data.

To minimize the amount of wasted space associated with pixels of the last row of an image, for which no further binary data 420 remains to define their color, the dimensions of the image 430 can be changed such that the width of the image can be decreased and, since the quantity of the binary values 420 to be transcoded does not change, the decreasing of the width of the image 430 can result in a corresponding increase in the height of the image. Of course, a corresponding increase in the height of the image can result in a greater number of rows of the image, with each row adding a certain amount of wasted space, depending on the image format utilized, for the reasons described in detail above.

As an example, the image 430 is shown in FIG. 4 in progressively narrower and taller images 491, 494 and 497, respectively. In the image 491, only two pixels of wasted space 493 can remain, but wasted space 492 can now exist for seven rows instead of the six of the image 430. Similarly, in the image 494, only a single pixel of wasted space 496 can remain, but wasted space 495 can now exist for nine rows, while, in the image 497, no pixels of wasted space can exist in the last row, but wasted space for 98 can now exist for 13 rows.

In one embodiment, computations can be undertaken to determine the dimensions of an image file that can support the binary values 420 of the BBPE code 410 being transcoded, while at the same time minimizing the amount of space wasted by the transcoding. In practice, the quantity of wasted space can often comprise less than 1% of the overall size of the resource being transcoded.

Figure 5:
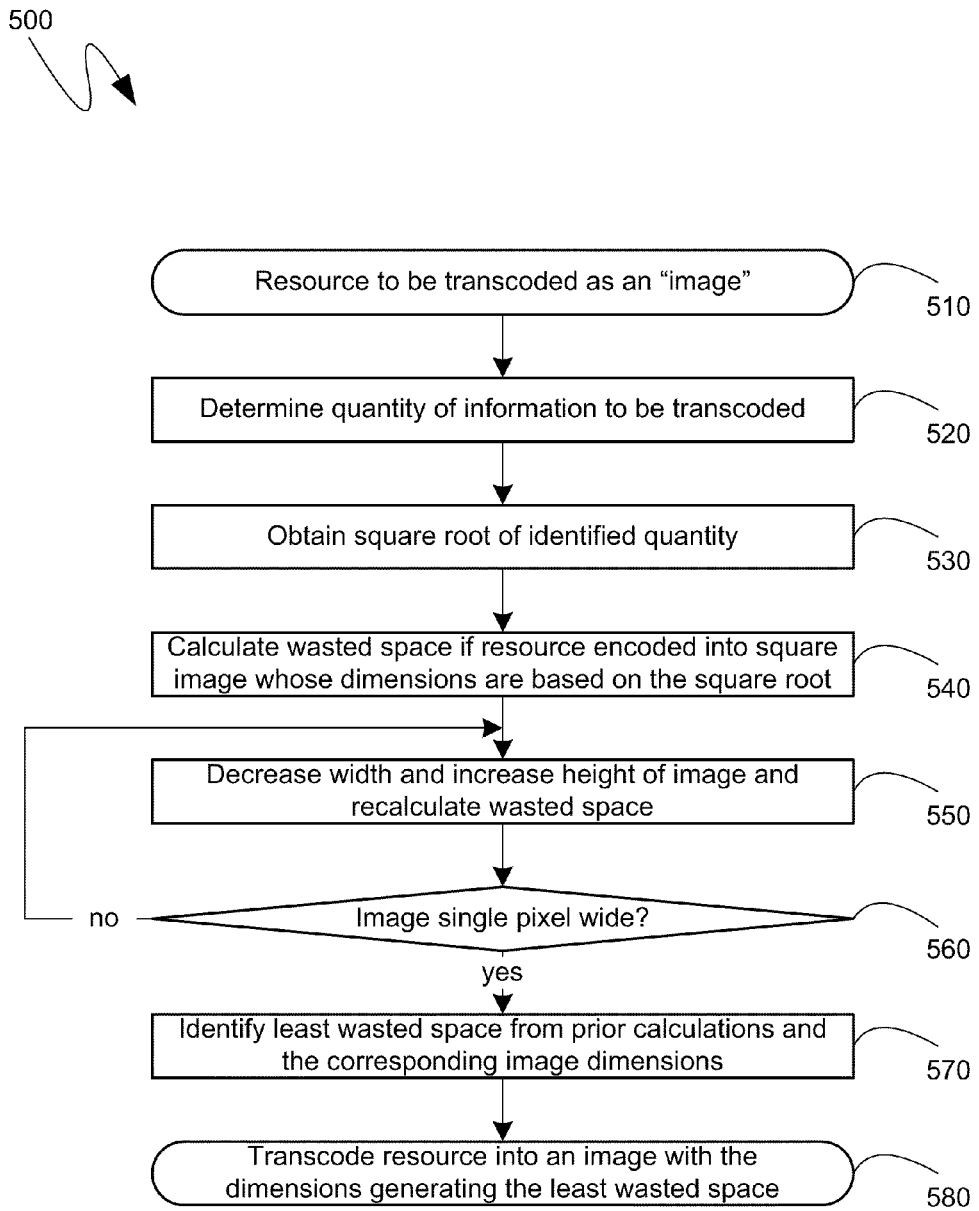
FIG. 5 is a flow diagram of an exemplary transcoding of resources as images.

Turning to FIG. 5, the flow diagram 500 shown therein illustrates an exemplary series of steps by which a resource can be transcoded as an image. As shown, initially, at step 510, the resource to be transcoded as an image can be provided. Subsequently, at step 520, the resource to be transcoded can be examined, and the quantity of information in the resource can be determined. At step 530, the quantity determined at step 520 can have the square root function applied to it to determine the height and width of a square image that can support the transcoded resource. For example, the square root obtained at step 530 can be divided by 32 to determine the number of 32-bit pixels associated with the height and width of a square image that can support the transcoded resource.

At step 540, a calculation can be made to determine the amount of wasted space, both from pre-row information required by the image encoding scheme being utilized and by wasted pixels at the end of the last row, that would exist if the resource was transcoded into a square image whose dimensions are based on the square root of painted step 530, such as through the conversion described above. Subsequently, at step 550, the width of the image can be decreased and, as a result, the height of the image can be increased, and the amount of wasted space can be recalculated based on the new image dimensions. If, at step 560, it is determined that the image is not yet a single pixel wide, processing can return to step 550 to again decrease the width, and increase the height, of the image file into which the resource is to be transcoded, and, at step 550, another determination can be made as to the amount of wasted space that would result from the transcoding of the resource into an image file of those dimensions.

Processing can proceed until, at step 560, is determined that the wasted space has been determined for a myriad of possible image size dimensions from a square to a one-pixel-wide rectangle. Once such a determination is made, at step 560, processing can proceed to step 570, at which point an identification can be made of the image dimensions that resulted in the least amount of wasted space. The relevant processing can then end with step 580, when the resource is transcoded into an image file having the dimensions identified at step 570. In such a manner, resources transcoded into image files can be only minimally larger than their original size.

The mechanisms described by the system 400 of FIG. 4, and the flow diagram 500 FIG. 5, can be performed independently, and typically well in advance of, any browser request for the resources transcoded as image files. As such, they can be performed by the server computing device that shares such transcoded image files across a network, or they can be performed by one or more dedicated server computing devices. In one embodiment, since many of the steps of the flow diagram 500 of FIG. 5 comprise image-centric calculations, they can be performed by dedicated graphics-oriented hardware, such as the graphics hardware interface 190 shown in FIG. 1.

As can be seen from the above descriptions, mechanisms for transcoding resources as image files so that the can be pre-fetched cross-domain by a browser application have been presented. In view of the many possible variations of the subject matter described herein, we claim as our invention all such embodiments as may come within the scope of the following claims and equivalents thereto.

I claim:

1. One or more computer-readable media comprising computer-executable instructions for enabling a cross-domain pre-fetching of resources, the computer-executable instructions directed to steps comprising:

requesting a resource, wherein the resource has been transcoded into an image file, and wherein further the image file has already been obtained by a browser application program from a second domain different from a first domain from which the browser application program obtained a data page referencing the resource;

decoding the image file into the resource; and processing the resource.

2. The computer-readable media of claim 1, wherein the computer-executable instructions directed to the requesting the resource comprise computer-executable instructions directed to requesting the image file, and wherein further the computer-executable instructions are executed within a browser-based programmatic environment.

3. The computer-readable media of claim 1, wherein the computer-executable instructions directed to the requesting the resource and the computer-executable instructions directed to the initiating execution are executed within a browser-based programmatic environment, and wherein further the browser application program comprises the computer-executable instructions directed to the decoding the image file into the resource.

4. The computer-readable media of claim 1, wherein the computer-executable instructions directed to the requesting the resource and the computer-executable instructions directed to the initiating execution are executed within a browser-based programmatic environment, and wherein the browser-based programmatic environment comprises the computer-executable instructions directed to the decoding the image file into the resource.

5. The computer-readable media of claim 1, wherein the computer-executable instructions directed to the decoding the image file comprise computer-executable instructions for concatenating bits from a set of pixels of the image file, the bits defining, within an image generated by the image file, an appearance of each pixel of the set of pixels.

6. The computer-readable media of claim 1, wherein the computer-executable instructions directed to the requesting the resource comprise computer-executable instructions for checking a pre-fetch completed flag and delaying the requesting the resource until the pre-fetch completed flag indicates that the image file has already been obtained by the browser application program from the second domain.

7. The computer-readable media of claim 6, wherein the computer-executable instructions directed to the requesting the resource comprise further computer-executable instructions for checking a pre-fetch commenced flag and not performing the delaying the requesting if the pre-fetch commenced flag indicates that the image file has not yet been requested by the browser application program from the second domain.

8. The computer-readable media of claim 1, wherein the browser application program requested the image file from the second domain concurrently with an instantiation of a browser-based programmatic environment.

9. The computer-readable media of claim 1, wherein the resource comprises further computer-executable instructions for executing within a browser-based programmatic environment; and wherein the computer-executable instructions directed to processing the resource comprise computer-executable instructions for initiating execution of the further computer-executable instructions.

10. The computer-readable media of claim 1, wherein the resource comprises at least one hypermedia file; and wherein the computer-executable instructions directed to processing the resource comprise computer-executable instructions for displaying the at least one hypermedia file and enabling user interactivity therewith.

11. One or more computer-readable media comprising computer-executable instructions for transcoding a resource into an image file to enable a cross-domain pre-fetching of the resource by a browser application program prevented from performing the cross-domain pre-fetching of the resource in its original form, the computer-executable instructions directed to steps comprising:
- segmenting bits of the resource into one or more segments of bits having a quantity of bits equivalent to a color depth defined by an image format to which the image file conforms; and
- generating one or more pixels within the image file such that an appearance, within a image generated by the image file, of each one of the one or more pixels is defined by a unique segment of bits from among the one or more segments of bits.

12. The computer-readable media of claim 11, wherein the resource comprises computer-executable instructions that are executable within a browser-based programmatic environment.

13. The computer-readable media of claim 11, wherein the resource comprises at least one hypermedia file.

14. The computer-readable media of claim 11, wherein the image format is a lossless image format.

15. A system for providing a more responsive user experience, the system comprising:
- a first set of computer-executable instructions downloadable from a first server computing device in a first domain, the first set of computer-executable instructions directed to steps comprising:
  - requesting an image file from a second domain different from the first domain, the image file having already been obtained by a browser application program;
  - decoding the image file into a resource; and
  - processing the resource; and
- a second set of computer-executable instructions for providing the image file to a second server computing device in the second domain, the second set of computer-executable instructions directed to steps comprising:
  - segmenting bits of the further computer-executable instructions into one or more segments of bits having a size defined by an image format to which the image file conforms;
  - generating one or more pixels within the image file such that an appearance, within a image generated by the image file, of each one of the one or more pixels is defined by a unique segment of bits from among the one or more segments of bits;
  - identifying dimensions of the image generated by the image file such that wasted space is minimized; and
  - arranging the generated one or more pixels into an image file having the identified dimensions.

16. The system of claim 15, wherein the computer-executable instructions directed to the decoding the image file comprise computer-executable instructions for concatenating bits from a set of pixels of the image file, the bits defining the appearance of each pixel of the set of pixels within the image generated by the image file.

17. The system of claim 15, wherein the computer-executable instructions directed to the requesting the image file comprise computer-executable instructions for checking a pre-fetch completed flag and delaying the requesting the image file until the pre-fetch completed flag indicates that the image file has already been obtained by the browser application program from the second domain.

18. The system of claim 17, wherein the computer-executable instructions directed to the requesting the image file comprise further computer-executable instructions for checking a pre-fetch commenced flag and not performing the delaying the requesting if the pre-fetch commenced flag indicates that the image file has not yet been requested by the browser application program from the second domain.

19. The system of claim 15, wherein the browser application program requested the image file from the second domain concurrently with an instantiation of a browser-based programmatic environment.

20. The system of claim 15, wherein the resource comprises further computer-executable instructions for executing within a browser-based programmatic environment; and wherein further the first set of computer-executable instructions directed to processing the resource comprise computer-executable instructions for initiating execution of the further computer-executable instructions.

\* \* \* \* \*